United States Patent [19]

Kengle

[11] Patent Number: 4,983,805
[45] Date of Patent: Jan. 8, 1991

[54] FLASHLESS D.C. BUTT WELDING ELECTRODES

[75] Inventor: George Kengle, Westland, Mich.

[73] Assignee: Kelsey-Hayes Company, Romulus, Mich.

[21] Appl. No.: 408,976

[22] Filed: Sep. 18, 1989

[51] Int. Cl.$^5$ .............................................. B23K 11/02
[52] U.S. Cl. ..................................................... 219/101
[58] Field of Search .................. 219/97, 100, 101, 102, 219/105

[56] References Cited

U.S. PATENT DOCUMENTS

| | | | |
|---|---|---|---|
| 2,877,337 | 3/1959 | Evans | 219/97 |
| 2,909,951 | 10/1959 | Rozmus et al. | 219/101 |
| 3,036,202 | 5/1962 | Stieglitz et al. | 219/97 |

Primary Examiner—Clifford C. Shaw
Attorney, Agent, or Firm—MacMillan, Sobanski & Todd

[57] ABSTRACT

A pair of clamping electrodes for use in flashless D.C. butt welding of aluminum and the like are disclosed. Each clamping electrode is provided with a clamping face for engaging opposed major surfaces of a work piece. The electrodes are configured so that, when a pair of opposed clamping electrodes are clamped around a workpiece having a pair of opposed major surfaces and a pair of opposed minor surfaces, the electrodes form opposed containment walls adjacent to the minor surfaces of said workpiece. The pair of opposed clamping electrodes preferably include pinching surfaces adjacent to each of the containment walls and the clamping surfaces. According to a preferred embodiment, a first clamping electrode is provided with a flat clamping surface and a second, opposed clamping electrode has a compound clamping surface including a flat clamping surface for engaging a major surface of a workpiece and two opposed containment walls adjacent the flat clamping surface. The containment walls are positioned to be adjacent to the minor surfaces of a workpiece when the clamping surface of the second electrode is engaged with a major surface of a workpiece.

14 Claims, 6 Drawing Sheets

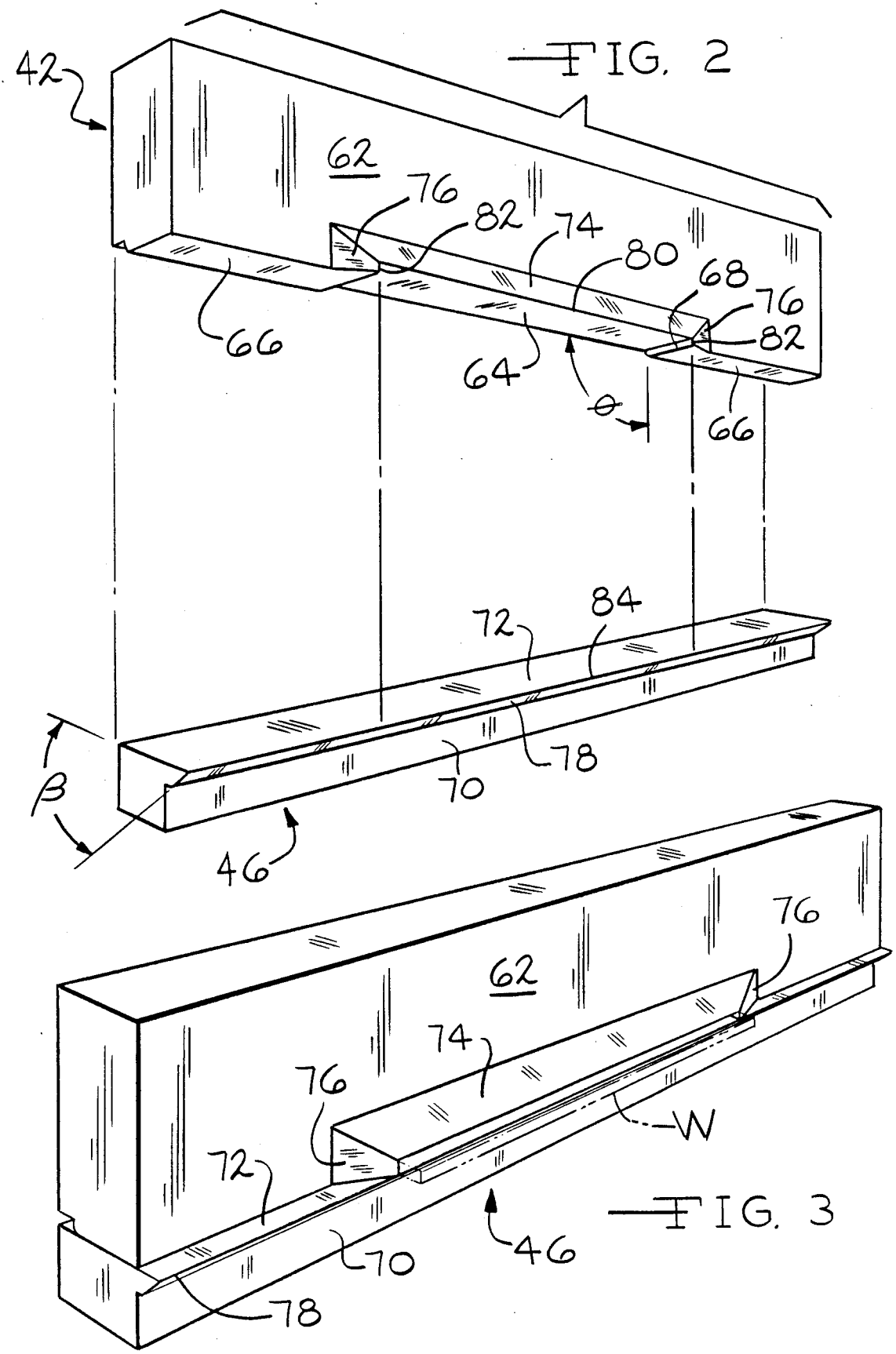

FLASHLESS D.C. BUTT WELDING ELECTRODES

BACKGROUND OF THE INVENTION

This invention relates to clamping electrodes for use in a flashless D.C. butt welding method. According to the method, two ends to be butt welded are softened, by resistance heating, and plunged together. Two opposed clamping electrodes, according to the invention, are specially configured and find particular utility in the butt welding of aluminum and like metals.

Heretofore, continuous bands or hoops of aluminum alloy have been produced by a flash butt welding technique applied to the opposed ends of bar stock that has been rolled into a hoop shape. In this process, each end of a rolled piece of bar stock is clamped between a pair of clamping electrodes, the ends are positioned so that there is a small air gap between them, a charge is applied to one of the two pairs of clamping electrodes to cause an arc between the ends of the stock and the ends are plunged together to produce a weld from which a fair amount of stock metal is upset.

The opposed clamping electrodes used in the flash butt welding of aluminum alloy bar stock comprise flat major clamping surfaces adapted to engage opposed major surfaces of the stock. This process, referred to in U.S. Pat. No. 4,185,370, produces excellent welds, as evidenced by the fact that the welds stand up to the subsequent roll forming techniques described in the patent. Nonetheless, flashless welding techniques, generally, offer some advantages over flash butt welding techniques. Specifically, flashless welding consumes less metal and less electrical energy, per weld. Moreover, flashless welding is cleaner in that it produces virtually no smoke.

Flashless butt welding techniques have been successfully applied to opposed ends of steel bar stock that has been rolled into a hoop. In this process, two ends of steel bar stock are brought into contact, heated by resistance heating until they are softened, and plunged together. The clamping electrodes that have been employed in the flashless D.C. butt welding of steel correspond with the electrodes discussed above with reference to the flash butt welding of aluminum. These clamping electrodes, which are illustrated in the drawings hereof, have been found to produce unsatisfactory welds in the flashless D.C. butt welding of aluminum alloy. The difficulties which arise from attempts to employ these known electrodes in the flashless D.C. butt welding of aluminum are discussed herein.

SUMMARY OF THE INVENTION

The invention is based upon the discovery of new clamping electrodes for use in flashless D.C. butt welding of aluminum and the like. Each clamping electrode is provided with a clamping face for engaging opposed major surfaces of a work piece. According to the invention, the electrodes are configured so that, when opposed clamping electrodes are clamped around a workpiece having a pair of opposed major surfaces and a pair of opposed minor surfaces, the electrodes form opposed containment walls adjacent to the minor surfaces of said workpiece. The opposed clamping electrodes preferably include pinching surfaces adjacent to each of the containment walls and the clamping surfaces. According to a preferred embodiment, one clamping electrode is provided with a flat clamping surface and the opposed clamping electrode has a compound clamping surface including a flat clamping surface for engaging a major surface of a workpiece and two opposed containment surfaces.

BRIEF DESCRIPTION OF THE DRAWINGS

FIG 2 is a perspective view of first and second opposed welding electrodes according to the present invention.

FIG. 3 is a perspective view of the electrodes shown in FIG. 2 in a closed position clamping a work piece illustrated in phantom lines.

DETAILED DESCRIPTION OF THE INVENTION

Figure 1:
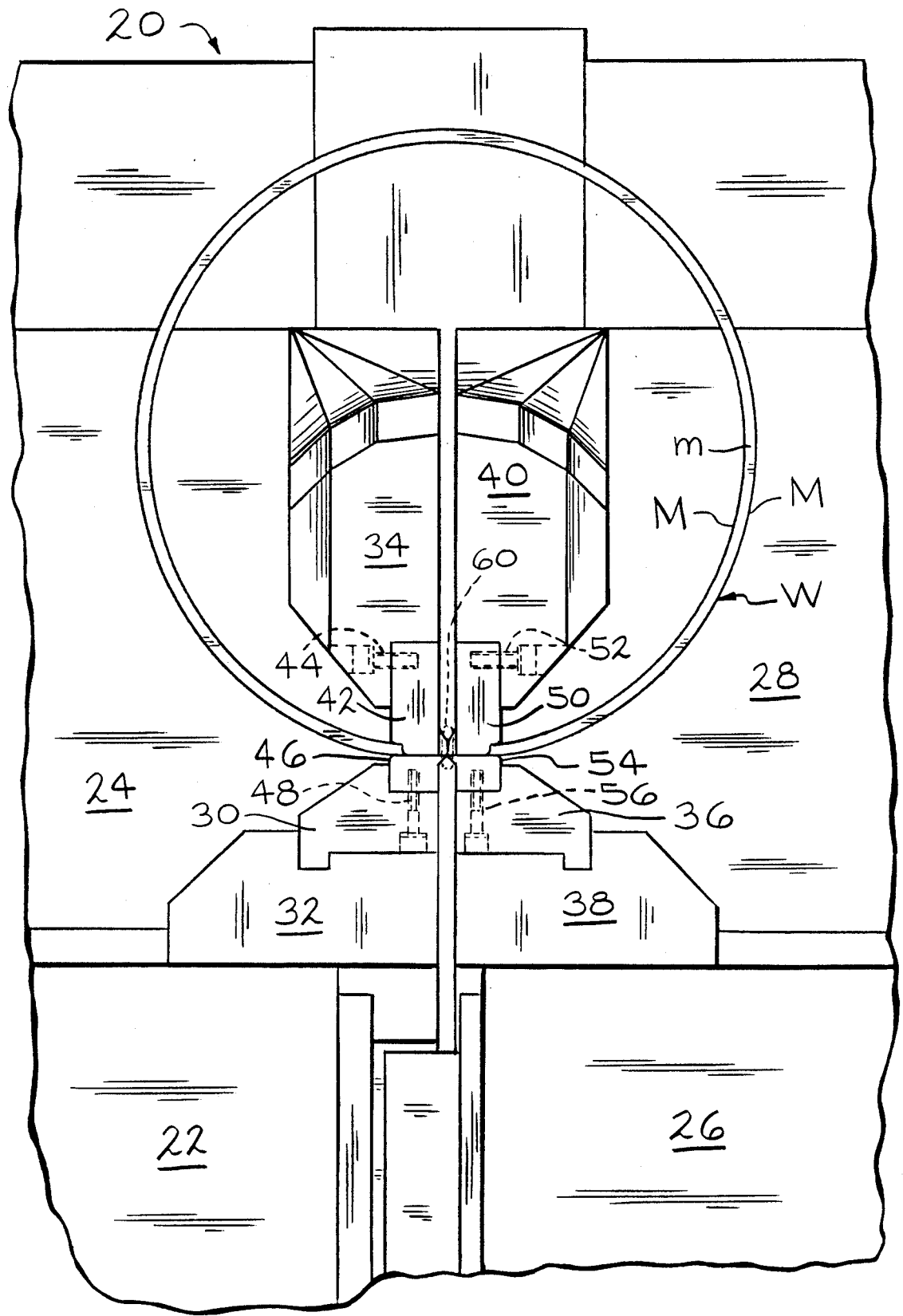
FIG. 1 is a front view of a portion of a D.C. welder on which welding electrodes according to the present invention are mounted.

FIG. 1 illustrates a portion of a D.C. welder 20 including a lower stationary arm 22 and an upper stationary arm 24, both of which are fixed relative to a base (not shown). The welder 20 further comprises a lower ram arm 26 and an upper ram arm 28 which are supported, relative to the base for horizontal sliding movement away from and towards the stationary arms 22 and 24. A lower, fixed, stationary jaw 30 is securely fastened to a block 32 which is, in turn, anchored to the lower stationary arm 22. Opposite the jaw 30 is an upper, clamping stationary jaw 34 which is supported on the upper stationary arm 24 for clamping and unclamping movement towards and away from the jaw 30. Similarly, a lower, fixed, ram jaw 36 is securely fastened to a block 38 which is, in turn, anchored to the lower ram arm 26. Opposite the jaw 36 is an upper, clamping, ram jaw 40 which is supported on the upper ram arm 28 for clamping and unclamping movement towards and away from the jaw 36.

The welder 20 includes hydraulic clamping means (not shown) for actuating the upper jaws 34 and 40, as well as hydraulic ram means (not shown) for driving the ram arms 26 and 28 towards and away from the stationary arms 22 and 24. The welder 20 further includes circuitry associated with the lower, fixed, stationary jaw 30 and the lower, fixed ram jaw 36 for selectively creating a D.C. potential between them. As described thus far, the welder 20 corresponds with a 1000 KVa H-AUSH D/C Welder made by Hess. Its construction is well known to those skilled in the art of D.C. welding and further description of the welder 20, apart from its operation, is believed to be unnecessary to an understanding of the instant invention.

A stationary, clamping electrode 42 is anchored to the upper, clamping stationary jaw 34 by a plurality of bolts, one of which is shown in hidden lines at 44. Opposite the electrode 42 is a stationary, fixed electrode 46 which is anchored to the jaw 30 by a plurality of bolts, one of which is shown in hidden lines at 48. A ram clamping electrode 50 is anchored to the upper, clamping, ram jaw 40 by a plurality of bolts, one of which is shown in hidden lines at 52. Opposite the electrode 50 is a ram, fixed electrode 54 which is anchored to the jaw 36 by a plurality of bolts, one of which is shown in hidden lines at 56.

A workpiece W comprising an initially discontinuous band or hoop of rolled aluminum magnesium alloy bar stock, is illustrated in FIG. 1, at the completion of a welding sequence by which free ends of the workpiece W have been welded together. During the welding operation, some of the bar stock from each free end is upset out of the weld site and the upset metal is shown in phantom lines at 60. The workpiece W has two opposed major surfaces M and two opposed minor surfaces m, one of which is shown in FIG. 1.

Referring now to FIGS. 2 and 3, the stationary clamping electrode 42 and the stationary fixed electrode 46 are shown in more detail. The stationary electrodes 42 and 46 have the same configurations as the ram electrodes 50 and 54 (FIG. 1), respectively. References to the former pair as stationary and the latter pair as ram are based, not upon differences in the electrodes, but upon the fact that one pair is mounted on stationary arms 22 and 24 and the other pair is mounted on ram arms 26 and 28. Accordingly, the following detailed description of one pair of electrodes applies to both pairs of electrodes.

The electrode 42 comprises a front face 62 and a clamping face 64 positioned between two electrode shoulders which include a stop face 66. Between the clamping face 64 and each of the stop faces 66 of the electrode shoulders, there is a containment wall 68.

The electrode 46 comprises a front face 70 and a clamping face 72. When the electrodes 42 and 46 are brought together to a clamping position illustrated in FIG. 3, the stop faces 66 of the electrode 42 abut opposed regions of the clamping surface 72 of the electrode 46. With the electrodes 42 and 46 in the clamping position, the clamping faces 64 and 70 firmly engage opposed major surfaces M of a workpiece W illustrated in phantom lines in FIG. 3. To ensure a firm engagement of the workpiece W between the clamping faces 64 and 70, the height of each of the containment walls 68 is controlled so that, when the electrodes 42 and 46 are in the clamping position, the clamping surfaces 64 and 72 are separated by a distance which is slightly less than the nominal thickness of the workpiece W, between the major surfaces M. Generally, the distance between the clamping surfaces 64 and 72, when the electrodes 42 and 46 are in the clamping position should be close to but slightly less than 100% of the thickness of a given workpiece. In the case of an aluminum magnesium alloy bar stock having a nominal thickness of 0.235 inches, good results have been obtained where, with the electrodes 42 and 46 closed, there was a distance of 0.225 inches between the clamping faces 64 and 72 or approximately 96% of the nominal thickness of the workpiece. In any event, the clamping faces 64 and 72 need to firmly engage the major surfaces M of the workpiece when the electrodes are closed.

The containment walls 68 are oriented, relative to the clamping surface 64, so that they form an angle $\bar{O}$. It is preferred that angle $\bar{o}$ be obtuse, i.e., greater than 90° and good results have been obtained where angle $\bar{o}$ was 97°. When the walls 68 are slightly tapered so that they are furthest apart immediately adjacent to the stop faces 66 of the electrode shoulders, this facilitates the step of positioning the electrode 42 in a clamping position relative to a workpiece W. It is preferred that the width of the clamping surface 64 of the electrode 42 be substantially equal to the width of a workpiece so that the containment walls 68, adjacent the stop faces 66 will be wider than the width of the workpiece.

Extending outwardly from the front faces 62 and 70 of the electrodes 42 and 46 are upset pinching shoulders. A shoulder including a pinching surface 74 is associated with the clamping surface 64. A pair of opposed pinching shoulders including pinching surfaces 76 are associated with the opposed containment walls 68. A shoulder including a pinching surface 78 is associated with the clamping surface 72 of the electrode 46. The pinching surface 78 forms an acute angle $\beta$ with the clamping surface 72 of the electrode 46. Although the size of angle $\beta$ is not critical, it is preferred that angle $\beta$ be approximately 60°. Angle $\beta$ has to be less than 90° in order to provide or define a space to receive the material 60 (FIG. 1) which is upset out of the weld site. Angles between the containment faces 68 and the pinching surfaces 76 as well as between the clamping face 64 and the pinching surface 74, are also preferably 60°, but, necessarily less than 90°.

The upset pinching shoulders terminate in edges 80, 82 and 84 defined, respectively, by the intersections between the clamping surface 64 and the pinching surface 74, the containment surfaces 68 and the pinching surfaces 76, and the clamping surface 72 and the pinching surface 78. The edges 80, 82 and 84 define a plane which preferably extends perpendicularly relative to opposed major surfaces M of the workpiece W. Thus, with the electrodes 42 and 46 in the closed position (FIG. 3), the workpiece W is circumscribed by the edges 80, 82 and 84.

Figure 4:
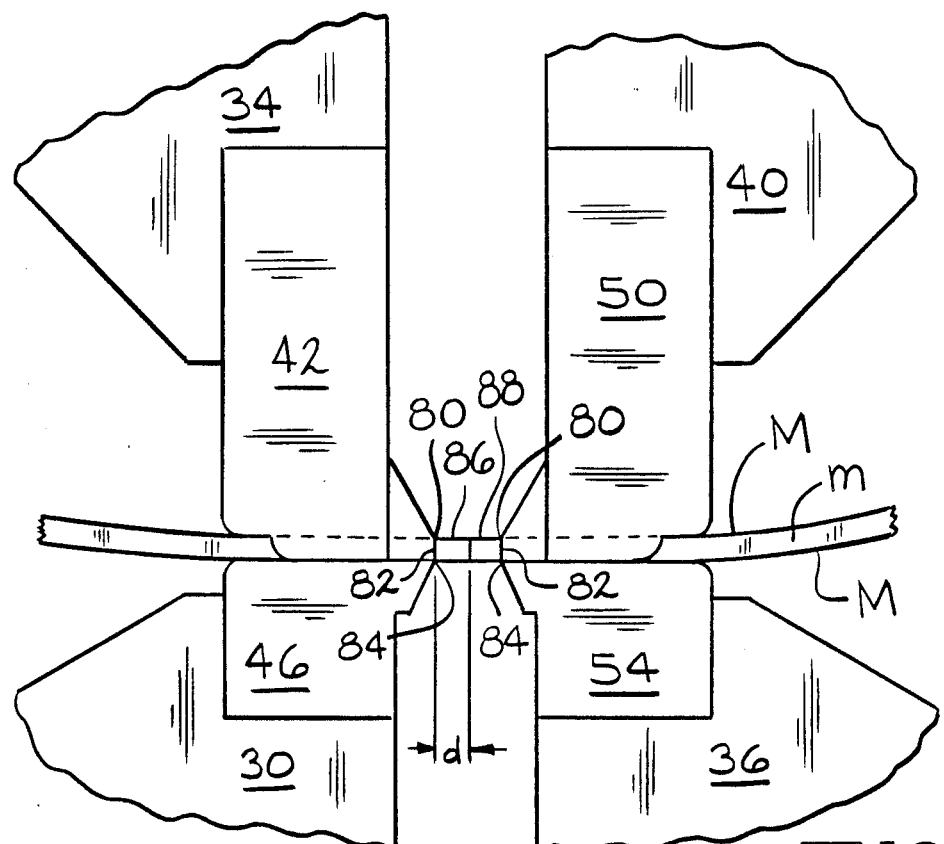
FIG. 4 is a side view of first and second pairs of opposed electrodes clamped on first and second ends of bar stock, just before they are plunged together.

A process for butt welding two ends of aluminum magnesium alloy bar stock will now be described with reference to FIG. 4. One end 86 of bar stock is clamped between electrodes 42 and 46. A portion of the bar stock extends beyond the edges 80, 82 and 84 a distance d. Preferably, distance d is slightly longer than the thickness of the bar stock. Good results have been obtained where d is approximately one and one quarter times the thickness of the bar stock.

Abutting the end 86 is an end 88 of bar stock which is clamped between ram electrodes 50 and 54. A like amount of the end 88 of the bar stock extends beyond the edges 80, 82 and 84 of the ram electrodes 50 and 54 which, as previously discussed, have the same configuration as the stationary electrodes 42 and 46. Accordingly, like reference numerals have been applied to corresponding elements of the electrodes 50 and 54.

With the ends 86 and 88 in contact, approximately 400 lbs. per square inch of hydraulic pressure is applied to a ram piston (not shown) in the welder 20, causing a ram force of about 7 tons to act through the ram arms 26 and 28 and through the ram jaws 36 and 40, urging the ends 88 and 86 together. Direct current is then passed through the weld site, between electrodes 46 and 54 causing resistance heating of the material adjacent the ends 86 and 88 of the bar stock. The current flow is maintained until the bar stock softens sufficiently to allow approximately 60 thousandths of an inch of movement of the ram electrodes under the applied force. Then, the current flow is stopped and the hydraulic pressure on the ram piston is increased to approximately 2000 lbs. per square inch, resulting in approximately 40 tons of ram force urging the ends 86 and 88 together. Under this force, the ram electrodes 50 and 54 are rapidly displaced to the left from the positions illustrated for them in FIG. 4 to the positions illustrated for them in FIG. 5. Although it is not clear from the detail shown in FIG. 5, displacement of the ram electrodes 50 and 54 is positively stopped when there is a slight gap between the edges 80 and 82 of the electrodes 42 and 50 as well as between the edges 84 of the electrodes 46 and 54. This gap is on the order of 10 to 20 thousandths of an inch.

The specific sequence of pressure and current is best carried out automatically and this can be accomplished with the addition of control equipment to the welder 20. Such control equipment can be obtained from Medar and programmed to carry out the described sequence. Variations in the sequence may be made to accommodate different bar stock material and sizes.

During displacement of the ram electrodes 50 and 54, a substantial amount of bar stock is upset out of the weld site. The amount of upset bar stock corresponds with the amount of bar stock which extended beyond the edges 80, 82 and 84 in FIG. 4, before the welding process began. The profile of the upset material, adjacent the opposed major surfaces M of the bar stock, is shown in phantom lines in FIG. 5 and is indicated by reference numeral 90. It can be seen from FIG. 5 that the upset material 90 extending from the major surfaces M of the welded bar stock has a profile which resembles a heart shape. Specifically, there are two hump areas 92 separated by a crease 94. The base of the heart shape has a thickness corresponding with the gap between the edges 80 and 82 of the electrodes 42 and 50 as well as between the edges 84 of the electrodes 46 and 54 at the completion of the welding operation, i.e., 10 to 20 thousandths of an inch. The upset material 90 can be scarfed or otherwise removed from the major surfaces M of the welded workpiece.

The crease 94 in the upset material 90 does not extend completely through the upset material 90, but terminates at some distance from the weld site and from the major surfaces M of the bar stock. Accordingly, when the upset material 90 is removed from the major surfaces M of the welded workpiece, the crease 94 is removed and there is no crack or crease in the weld site. Details regarding the condition of the upset material 90 adjacent the minor opposed surfaces of the bar stock are discussed below with reference to FIGS. 6 and 7.

Figure 8:
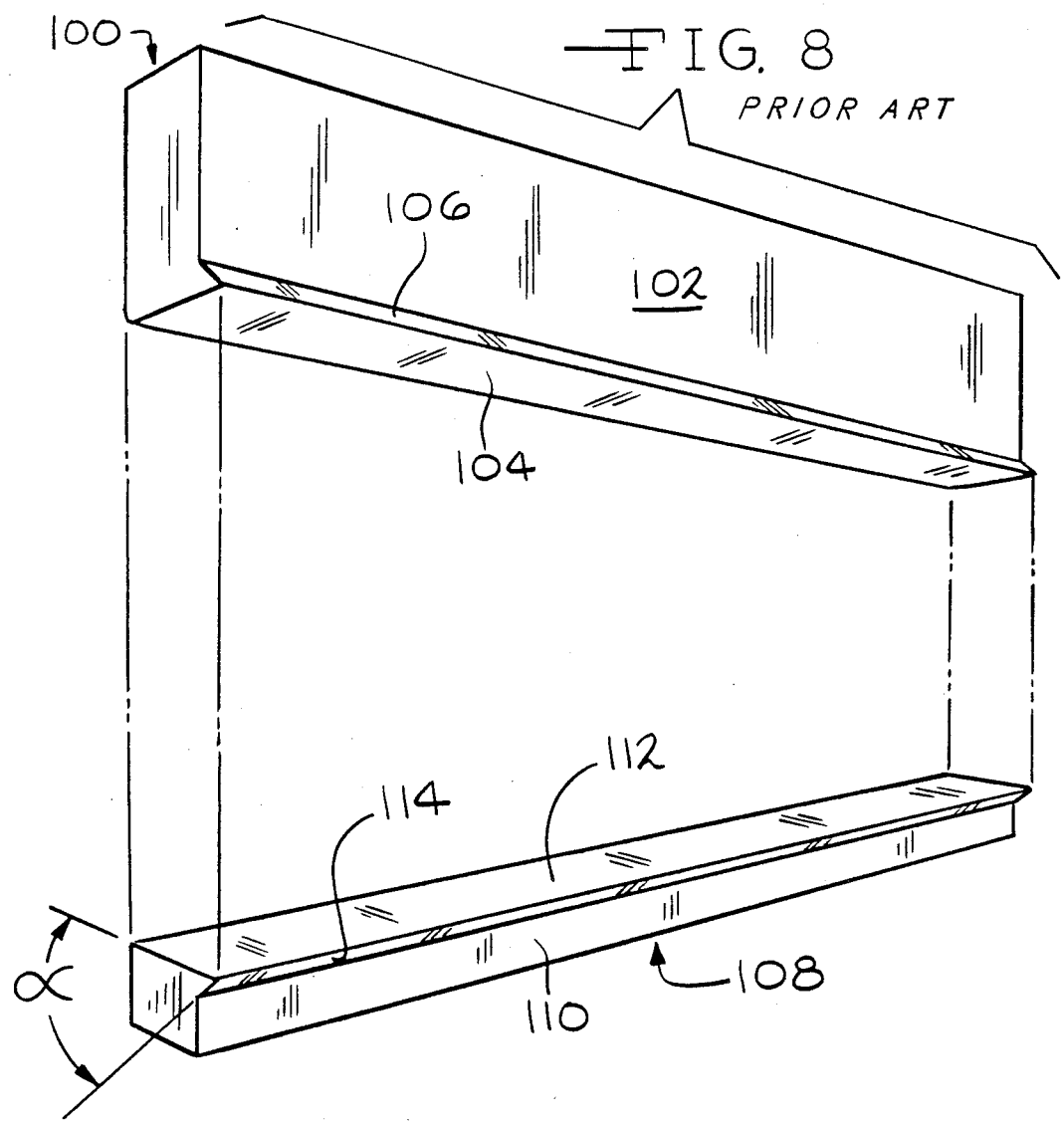
FIG. 8 is an exploded perspective view of a pair of known clamping electrodes that are used to clamp aluminum bar stock in a flash butt welding process.

The upset material 90 adjacent the minor surfaces m also has a profile which resembles a heart shape with two hump shaped regions 96 and a crease 98 which extends between the humps 96. The crease 98, in the vicinity of the minor surfaces m of the welded workpiece, does not extend through the upset material but terminates at some distance from the weld site and the minor surfaces m. Accordingly, the butt weld produced with electrodes according to the invention is one which is free from cracks, even in the vicinity of the minor surfaces m of the welded workpiece. This is not true of flashless butt welds of aluminum magnesium alloy bar stock made with known clamping electrodes. Such electrodes are described below with reference to FIG. 8.

A known clamping electrode 100 has a front face 102 and a clamping face 104. A pinching shoulder, defined by a pinching surface 106, extends outwardly from the front face 102. A known fixed electrode 108 has a front face 110 and a clamping face 112. The fixed electrode 108 includes a pinching shoulder defined by a pinching surface 114. The fixed electrode 108 corresponds with the fixed electrode 46, except for the size of acute angle â formed between the clamping surface 112 and the pinching surface 114. Angle â is 45°, as is the acute angle formed between the clamping surface 104 and the pinching surface 106. The smaller angle of 45 between the pinching surfaces and the clamping surfaces has been found to be operable in electrodes according to the invention. However, as stated above, an acute angle of 60° is preferred.

Figure 9:
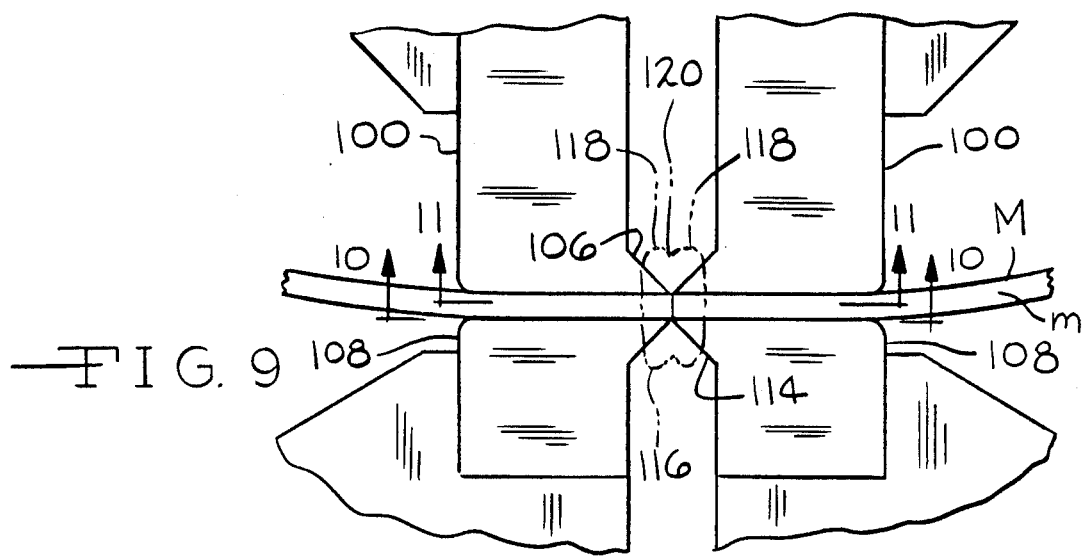
FIG 9 is a side view of first and second pairs of opposed electrodes of the type shown in FIG. 8, clamped on first and second ends of bar stock just before the ends are plunged together.
Figure 10:
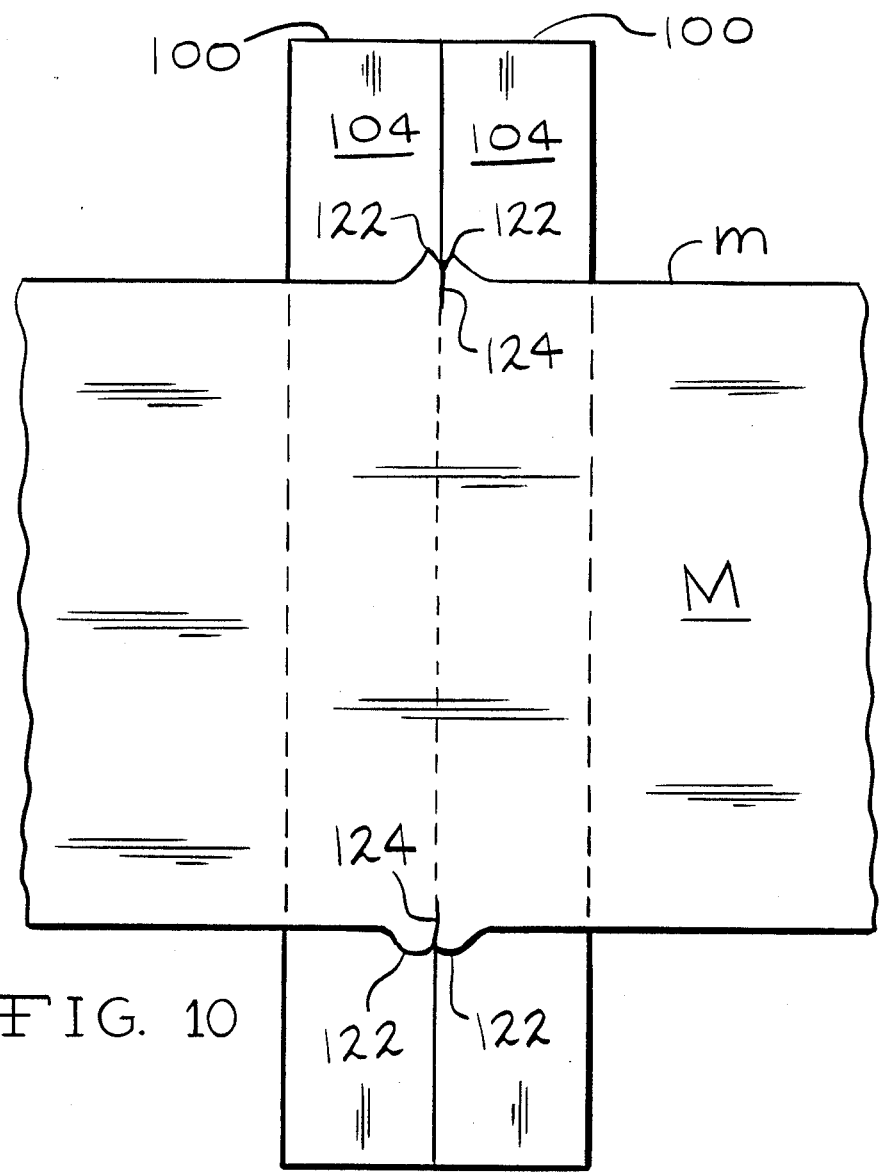
FIG 10 is a sectional view taken along the line 10—10 of FIG. 9.
Figure 11:
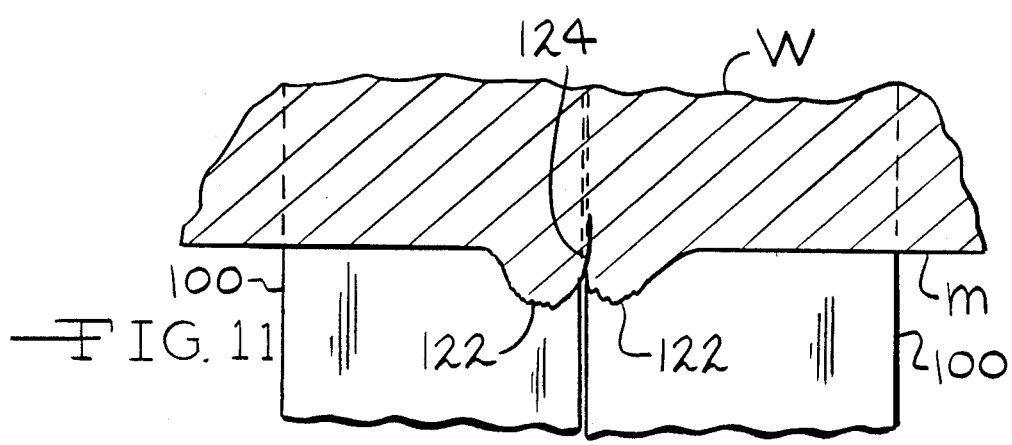
FIG. 11 is a sectional view taken along the line 11—11 of FIG. 9

FIGS. 9, 10 and 11 show the results of an attempt to use an opposed pair of known clamping and fixed electrodes 100 and 108 in the flashless butt welding of aluminum magnesium alloy bar stock. During the welding process, corresponding with the process described above with reference to FIGS. 4 and 5, a substantial amount of bar stock is upset out of the weld site. The profile of the upset material, adjacent the major surfaces of the bar stock, is shown in phantom in FIG. 9, indicated generally at 116. In profile, the upset material 116 adjacent the major surfaces M is heart shaped including two humps 118 and a crease 120.

As shown in FIGS. 10 and 11, the upset material adjacent the minor surfaces m of the bar stock is not heart shaped. The upset material 116, however, does have two humps 122 with a crease 124 between the humps 122. It should be noted in FIG. 10 that the upset material adjacent the minor surfaces m has one profile on one side of the bar stock and a substantially different profile on the other side of the bar stock. Thus, it is shown that attempts to use known electrodes in flashless D.C. butt welding of aluminum magnesium alloy produces inconsistent results in the area adjacent the minor surfaces m of the bar stock.

FIGS. 10 and 11 highlight another problem that was encountered regularly with the attempted use of the prior art electrodes in the flashless D.C. butt welding of aluminum magnesium alloy. The creases 124 extend between the humps 122, inwardly to and past the plane of the minor surface m of the bar stock. Accordingly, after the upset material 116 is removed from the weld site, a portion of the crease 124 will be evident in the weld site, adjacent the minor surfaces m. Thus, in the flashless D.C. butt weld produced with the known electrodes, the crease 124, which is nothing more than a crack, will not be completely removed with the upset material 116. The presence of a crack in a weld site renders the weld unacceptable.

Figure 5:
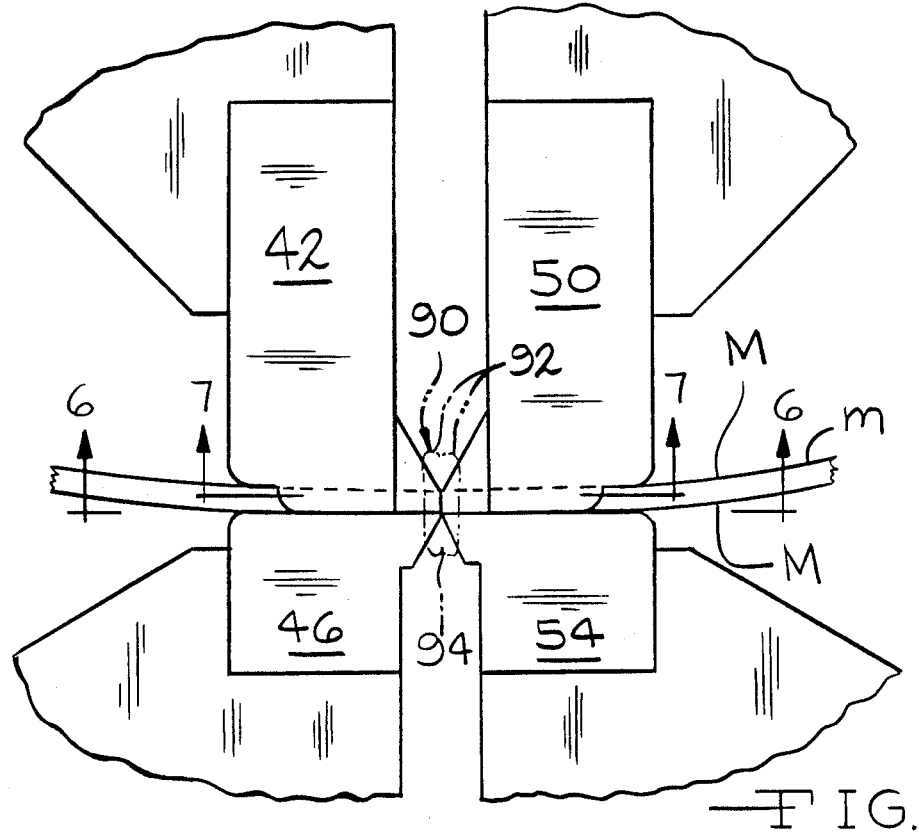
FIG. 5 is a side view corresponding with FIG. 4 but showing the ends after they have been plunged together.
Figure 6:
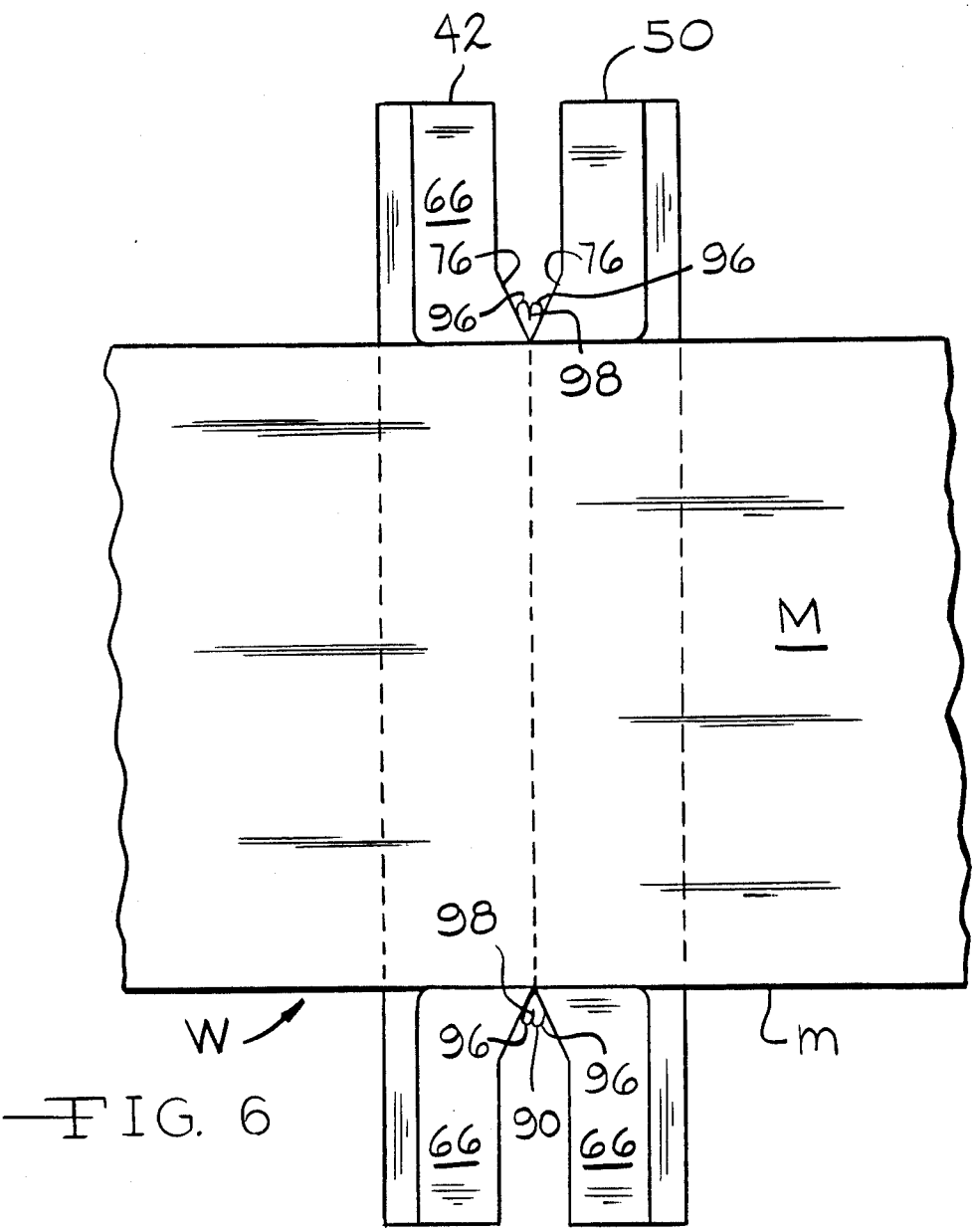
FIG. 6 is a sectional view taken along the line 6—6 of FIG. 5.
Figure 7:
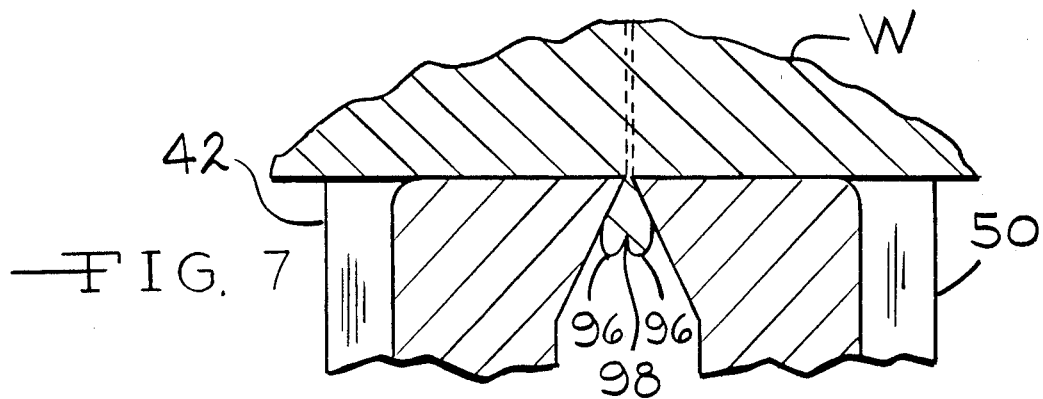
FIG. 7 is a sectional view taken along the line 7—7 of FIG. 5.

It should be noted that the illustrations of the upset material 116 in FIGS. 9, 10 and 11 and the upset material 90 in FIGS. 5, 6 and 7, are, necessarily, somewhat stylized. For example, generally, the humps 92, 96 and 118 tended to be less symmetrical than they are illustrated. Nonetheless, these illustrations are representative of the results obtained under the conditions described in connection with these FIGS. Accordingly, in a particular case, the upset material 116 and 90 would not have the exact configuration illustrated for it in the drawings. Indeed, there were variations in the exact profile of the upset material as between different welds, especially in connection with the use of the known electrodes as noted above with reference to FIG. 10. There were even variations in the profile of upset material at different locations on a specific weld. However, the illustrations accurately depict a problem with creases in butt welds produced using known electrodes, and the elimination of that problem in welds produced using electrodes according to the present invention.

A variety of materials are suitable for producing electrodes according to the present invention. In the case of clamping electrodes 42 and 50, a high temperature stainless steel is preferred, specifically, an #H-13 stainless steel hardened to Rockwell C-48 to C-50. For the fixed electrodes 46 and 54, a copper alloy is preferred, specifically, a Class 3 copper alloy. Copper is preferred for the fixed electrodes in this instance because, in the Hess welder 20, the fixed electrodes 46 and 54 are the hot electrodes through which current is applied to effect resistance heating of the workpiece. Accordingly, the good conductivity of copper is desired for the hot electrode, whether it is a clamping electrode or a fixed electrode.

It should be appreciated that the containment walls 48 can be provided on the fixed electrodes 46 and 54 instead of the clamping electrodes 42 and 50. If desired, one could provide one containment wall on a fixed electrode and an opposed containment wall on a clamping electrode. Alternatively, half height containment walls could be provided on all of the electrodes 42, 46, 50 and 54 so that, when they are clamped around a workpiece, the half height containment walls form full containment walls. Moreover, the clamping electrodes 42 and 50 could just as well be fixed electrodes in the sense that they could be mounted on arms that are not equipped with hydraulic clamping means. In that case, the fixed electrodes 46 and 54 could be mounted on arms that are equipped with hydraulic clamping means.

I claim:

1. A set of first and second electrodes for clamping bar stock having first and second opposed major surfaces separated by a distance D, and first and second opposed minor surfaces,
    said first electrode comprising a clamping surface for engaging one of said major surfaces,
    said second electrode comprising a clamping surface for engaging the other one of said major surfaces,
    said first and second electrodes further comprising containment wall means operable, when the clamping surfaces of the first and second electrodes are engaged with the first and second opposed major surfaces of bar stock, to define first and second containment walls adjacent to the first and second minor surfaces of the bar stock, and
    pinching surfaces associated with the clamping surfaces and the containment walls.

2. A set of electrodes as claimed in claim 1 wherein said containment wall means are carried by said first electrode and wherein said means comprise containment walls which intersect the clamping surface of the first electrode and form therewith an obtuse angle.

3. A set of electrodes as claimed in claim 2 wherein said pinching surfaces form acute angles with the associated clamping surfaces and said containment walls, and wherein said angle is approximately sixty degrees.

4. A set of electrodes as claimed in claim 3 wherein said first electrode further comprises a pair of electrode shoulders including stop face means for engaging said clamping surface of the second electrode when the clamping surfaces of said first and second electrodes are separated by a distance which is slightly less than D.

5. A set of electrodes as claimed in claim 2 wherein said first electrode further comprises a pair of electrode shoulders including stop face means for engaging said clamping surface of the second electrode when the clamping surfaces of said first and second electrodes are separated by a distance which is slightly less than D.

6. A set of electrodes as claimed in claim 1 wherein said pinching surfaces form acute angles with the associated clamping surfaces and said containment walls, and wherein said angle is approximately sixty degrees.

7. A set of first and second electrodes for clamping bar stock having first and second opposed major surfaces separated by a distance D and first and second opposed minor surfaces,
    said first electrode comprising
        a clamping surface for engaging one of said major surfaces, and
        a pinching surface associated with the first electrode clamping surface, said pinching surface terminating in an edge defined by its intersection with the clamping surface,
    said second electrode comprising
        a clamping surface for engaging the other one of said major surfaces,
        containment wall means operable, when the clamping surfaces of the first and second electrodes are engaged with the first and second opposed major surfaces of bar stock, to define first and second containment walls adjacent to the first and second minor surfaces of the bar stock, and
        pinching surfaces associated with the second electrode clamping surface and the containment walls, said pinching surfaces terminating in edges defined by their intersections with the associated clamping surface and containment walls so that, when the electrodes are clamped about the bar stock, said edges and said edge of the first electrode are coplanar in a plane which is substantially perpendicular to the major and minor surfaces of the bar stock.

8. A set of electrodes as claimed in claim 7 wherein said pinching surfaces form acute angles with the associated clamping surfaces and said containment walls and wherein said angle is approximately sixty degrees.

9. A set of electrodes as claimed in claim 8 wherein said first electrode further comprises a pair of electrode shoulders including stop face means for engaging said clamping surface of the second electrode when the clamping surfaces of said first and second electrodes are separated by a distance which is slightly less than D.

10. A set of electrodes as claimed in claim 7 wherein said first electrode further comprises a pair of electrode shoulders including stop face means for engaging said clamping surface of the second electrode when the clamping surfaces of said first and second electrodes are separated by a distance which is slightly less than D.

11. A set of first and second electrodes for clamping bar stock having first and second opposed major surfaces separated by a distance D and first and second opposed minor surfaces,
    said first electrode comprising
        a clamping surface for engaging one of said major surfaces, and a pinching surface associated with the first electrode clamping surface, said pinching surface terminating in an edge defined by its intersection with the clamping surface, said pinching surface forming an angle with said clamping surface of approximately sixty degrees, said second electrode comprising a clamping surface for engaging the other one of said major surfaces, containment walls which, when the clamping surface of the second electrode is engaged with the first or second opposed major surface of bar stock, define first and second containment walls adjacent to the first and second minor surfaces of the bar stock, and pinching surfaces associated with the second electrode clamping surface and the containment walls, said pinching surfaces forming angles with said clamping surface and said containment walls of approximately sixty degrees, said pinching surfaces terminating in edges defined by their intersections with the associated clamping surface and containment walls so that, when the electrodes are clamped about the bar stock, said edges and said edge of the first electrode are coplanar in a plane which is substantially perpendicular to the major and minor surfaces of the bar stock.

12. A set of electrodes as claimed in claim 11 wherein said first electrode further comprises a pair of electrode shoulders including stop face means for engaging said clamping surface of the second electrode when the clamping surfaces of said first and second electrodes are separated by a distance which is slightly less than D.

13. A set of electrodes as claimed in claim 11 wherein said containment walls intersect the clamping surface of the first electrode and form therewith an angle which is slightly larger than ninety degrees.

14. A set of electrodes as claimed in claim 12 wherein said containment walls intersect the clamping surface of the first electrode and form therewith an angle which is slightly larger than ninety degrees.

* * * * *